US012583790B2

(12) United States Patent
Wang et al.

(10) Patent No.: US 12,583,790 B2
(45) Date of Patent: Mar. 24, 2026

(54) SYSTEM AND METHOD FOR PREPARING SULPHOALUMINATE CEMENT FROM SOLAR ENERGY STORED HEAT DRIED SLUDGE

(71) Applicant: SHANDONG UNIVERSITY, Shandong (CN)

(72) Inventors: Wenlong Wang, Jinan (CN); Jiazheng Zhang, Jinan (CN); Yanpeng Mao, Jinan (CN); Yanmin Huang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 847 days.

(21) Appl. No.: 17/915,623

(22) PCT Filed: Sep. 9, 2021

(86) PCT No.: PCT/CN2021/117505
§ 371 (c)(1),
(2) Date: Sep. 29, 2022

(87) PCT Pub. No.: WO2023/035197
PCT Pub. Date: Mar. 16, 2023

(65) Prior Publication Data
US 2024/0246857 A1 Jul. 25, 2024

(30) Foreign Application Priority Data
Sep. 7, 2021 (CN) .......................... 202111045078.1

(51) Int. Cl.
*C04B 18/30* (2006.01)
*C04B 28/14* (2006.01)
(Continued)

(52) U.S. Cl.
CPC ............ *C04B 18/305* (2013.01); *C04B 28/14* (2013.01); *F24S 10/70* (2018.05); *F24S 23/71* (2018.05)

(58) Field of Classification Search
None
See application file for complete search history.

(56) References Cited

U.S. PATENT DOCUMENTS 3,954,069 A * 5/1976 Loken ..................... C02F 11/12
110/221
10,030,636 B2 * 7/2018 Barsi ....................... F03G 6/067
(Continued)

FOREIGN PATENT DOCUMENTS

CN 108409095 A 8/2018
CN 208250141 U 12/2018
(Continued)

OTHER PUBLICATIONS

May 7, 2022 International Search Report issued in International Patent Application No. PCT/CN2021/117505.
(Continued)

*Primary Examiner* — David J Laux
(74) *Attorney, Agent, or Firm* — Oliff PLC

(57) ABSTRACT

A system and method for preparing sulphoaluminate cement from solar energy stored heat dried sludge. Solar concentrator connected to high-temperature molten salt storage tank, superheater, preheating-evaporator and low-temperature molten salt storage tank to form mixed molten salt heat transfer-heat storage circulation system; superheated steam in superheater enters ultra-disc dryer, and ultra-disc dryer connected to water storage tank and preheating-evaporator superheater to form water heat transfer circulation system; wet sludge bin connected to ultra-disc dryer and inlet of dried sludge bin, and dried sludge conveyed to dried sludge bin for storage; and cement production system separately (Continued)

connected with waste gas outlet of ultra-disc dryer and outlet of dried sludge bin. System can use valley electricity to supplement heat at any specific time, and coupled with cement kiln; waste gas introduced into cement kiln for waste burning; dried sludge mixed with other solid waste to enter cement kiln to prepare sulphoaluminate cement.

10 Claims, 1 Drawing Sheet

(51) Int. Cl.
　　*F24S 10/70*　　　　(2018.01)
　　*F24S 23/71*　　　　(2018.01)

(56)　　　　　References Cited

U.S. PATENT DOCUMENTS

| | | | | |
|---|---|---|---|---|
| 2003/0113432 A1* | 6/2003 | Yoshitomi | .............. | A23L 17/10 |
| | | | | 426/643 |
| 2013/0000532 A1* | 1/2013 | Rabiner | ................. | F23G 7/006 |
| | | | | 110/346 |

| | | | | |
|---|---|---|---|---|
| 2013/0014678 A1* | 1/2013 | Knoer | ................... | F26B 23/028 |
| | | | | 34/477 |
| 2014/0033776 A1* | 2/2014 | Josse | ....................... | C05F 17/15 |
| | | | | 71/10 |
| 2014/0346108 A1* | 11/2014 | Josse | ......................... | C05F 7/00 |
| | | | | 95/263 |
| 2015/0329399 A1* | 11/2015 | Kumar | .................... | C05F 17/15 |
| | | | | 71/10 |
| 2016/0115945 A1* | 4/2016 | Barsi | ....................... | F24S 60/10 |
| | | | | 126/618 |
| 2021/0088032 A1* | 3/2021 | Zeng | ....................... | F03G 6/114 |

FOREIGN PATENT DOCUMENTS

| | | |
|---|---|---|
| CN | 111238063 A | 6/2020 |
| CN | 211739522 U | 10/2020 |

OTHER PUBLICATIONS

May 7, 2022 Written Opinion issued in International Patent Application No. PCT/CN2021/117505.

* cited by examiner

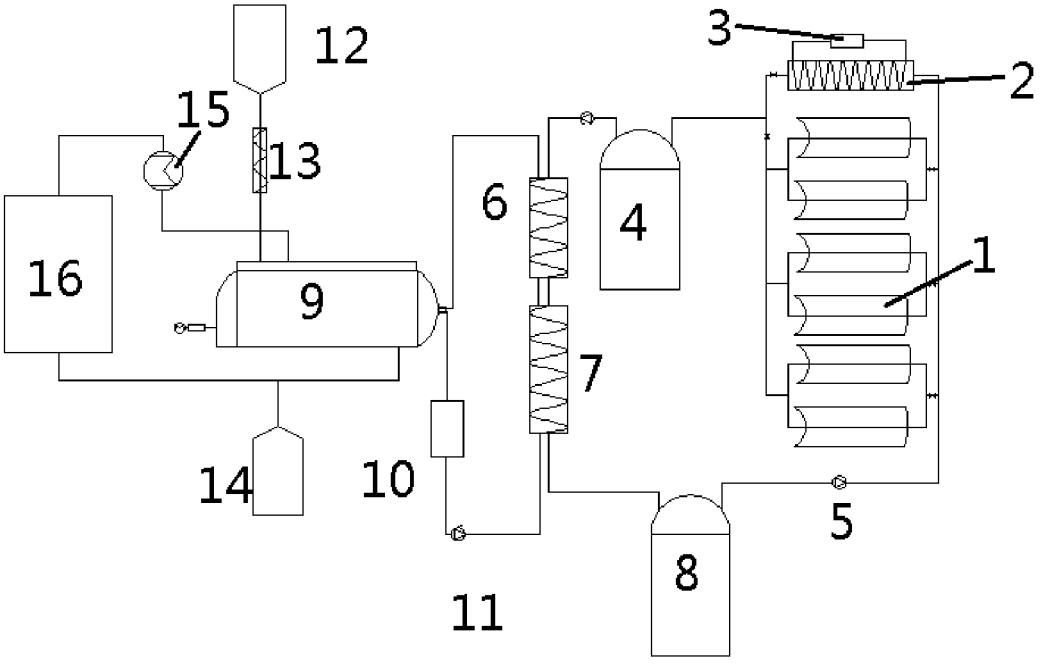

SYSTEM AND METHOD FOR PREPARING SULPHOALUMINATE CEMENT FROM SOLAR ENERGY STORED HEAT DRIED SLUDGE

TECHNICAL FIELD

The present invention belongs to the technical field of solar energy utilization, and relates to a system and method for preparing sulphoaluminate cement from solar energy stored heat dried sludge.

BACKGROUND

Information of the Related Art part is merely disclosed to increase the understanding of the overall background of the present invention, but is not necessarily regarded as acknowledging or suggesting, in any form, that the information constitutes the related art known to a person of ordinary skill in the art.

At present, the treatment amount of domestic sewage in China is increasing continuously, and the sludge with the water content above 80% generated accordingly is also increasing continuously. Sludge dewatering is the premise of comprehensive treatment and utilization of sludge. Because of the high water content, the wet sludge requires to consume a large amount of energy for drying treatment, then large-scale synergistic treatment can be carried out in the cement kiln, and at the same time, the odor generated in the drying process and after drying needs to be treated. Currently, the main sludge dewatering technology is large in heat consumption, and the tail gas can be discharged only after being disposed. With the traditional greenhouse drying process, the solar sludge drying technology has the problems that the efficiency is low and the stink inside and around the device is difficult to deal with.

SUMMARY

In order to solve the deficiencies in the prior art, the present invention provides a system and method for preparing sulphoaluminate cement from solar energy stored heat dried sludge. A mixed molten salt is used for heat transfer and heat storage to solve the problem that solar energy can only be generated at specific time. A bypass electric heating system is disposed to improve the system stability, so that valley electricity can be used for supplementing heat at night or at other specific time. The system is coupled with a cement kiln, waste gas is introduced into the cement kiln for waste burning, and dried sludge is mixed with other solid waste to enter the cement kiln to prepare the sulphoaluminate cement.

Specifically, the present invention is implemented by the following technical solutions:

In a first aspect of the present invention, a system for preparing sulphoaluminate cement from solar energy stored heat dried sludge is characterized in that: a solar concentrator is successively connected to a high-temperature molten salt storage tank, a superheater, a preheating-evaporator and a low-temperature molten salt storage tank to form a mixed molten salt heat transfer-heat storage circulation system; superheated steam in the superheater enters an ultra-disc dryer, and the ultra-disc dryer is successively connected to a water storage tank and a preheating-evaporator superheater to form a water heat transfer circulation system; a wet sludge bin is connected to the ultra-disc dryer and an inlet of a dried sludge bin, and dried sludge is conveyed to the dried sludge bin for storage; and a cement production system is separately connected with a waste gas outlet of the ultra-disc dryer and an outlet of the dried sludge bin.

In a second aspect of the present invention, a method for preparing sulphoaluminate cement from solar energy stored heat dried sludge, based on the above system for preparing sulphoaluminate cement from solar energy stored heat dried sludge, comprising:

heating a mixed molten salt by the solar concentrator, a part of the heated high-temperature mixed molten salt flowing to the high-temperature molten salt storage tank for storage, and the other part of the heated high-temperature mixed molten salt flowing to the superheater and the preheating-evaporator for heat exchange; making the mixed molten salt after heat exchange flow to the low-temperature molten salt storage tank, and re-flow into the solar concentrator under the action of the molten salt pump;

making superheated steam formed after performing heat exchange in the superheater enter the ultra-disc dryer to be subjected to heat exchange with wet sludge, the superheated steam condensing in the heat exchange process and entering the water storage tank, and water in the water storage tank re-entering the preheating-evaporator and the superheater for circulation under the action of the circulating water pump; conveying dried sludge to the dried sludge bin for storage, and the dried sludge entering the cement production system for preparing the sulphoaluminate cement after being mixed with solid waste; and making waste gas formed in the sludge drying process enter a decomposing furnace of the cement production system for incineration.

In a third aspect of the present invention, application of the above system for preparing sulphoaluminate cement from solar energy stored heat dried sludge and/or the above method for preparing sulphoaluminate cement from solar energy stored heat dried sludge in sewage treatment is provided.

One or more embodiments of the present invention have the following beneficial effects:

(1) With the help of the solar concentrator and the mixed molten salt, solar energy is converted into thermal energy, and sludge is dried in the integration of heat transfer and heat storage, thus reducing energy consumption and improving efficiency at the same time.

(2) While heat of the solar energy is stored, an electric heating system is disposed to deal with various situations in an emergency way to enable the system to operate safely and stably, which solves the problem that the solar energy is generated at specific time.

(3) In cooperation with the cement production system, while being dried, the sludge can be harmlessly disposed and utilized to produce the sulphoaluminate cement.

(4) When the illumination intensity is extremely low in winter or in adverse weather such as continuous rainfall, heat can be supplemented by a bypass system, and the molten salt is heated by reheating steam in a waste heat boiler of the cement production system. In a cement production line without a waste heat boiler, a molten salt electric heater can be disposed for heat supplement to cope with the influence of extreme weather, and valley electricity can be fully used when heat needs to be supplemented at night.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention. The following describes implementations of the present invention in detail with reference to the accompanying drawings.

FIG. 1 is a system for preparing sulphoaluminate cement from solar energy stored heat dried sludge as described in Example 1, wherein: 1, solar concentrator, 2, molten salt heater, 3, electric cabinet; 4, high-temperature molten salt storage tank; 5, molten salt pump; 6, superheater; 7, pre-heating-evaporator; 8, low-temperature molten salt storage tank; 9, ultra-disc dryer; 10, water storage tank; 11, circulating water pump; 12, wet sludge bin; 13, screw conveying equipment; 14, dried sludge bin; 15, condenser; and 16, cement production system.

DETAILED DESCRIPTION

The present invention is further described below in conjunction with specific embodiments. It should be understood that these examples are only used to illustrate the present invention and not to limit the scope of the present invention. Experimental methods of which specific conditions are not set forth in the following embodiments generally follow conventional conditions or conditions suggested by the manufacturer.

It should be noted that the terms used herein are merely used for describing specific implementations, and are not intended to limit exemplary implementations of the present invention. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

Currently, the main sludge dewatering technology is large in heat consumption, and the tail gas can be discharged only after being disposed. With the traditional greenhouse drying process, the solar sludge drying technology has the problems that the efficiency is low and the stink inside and around the device is difficult to deal with. For this purpose, the present invention provides a system and method for preparing sulphoaluminate cement from solar energy stored heat dried sludge.

In one or more embodiments of the present invention, a system for preparing sulphoaluminate cement from solar energy stored heat dried sludge is characterized in that: a solar concentrator is successively connected to a high-temperature molten salt storage tank, a superheater, a pre-heating-evaporator and a low-temperature molten salt storage tank to form a mixed molten salt heat transfer-beat storage circulation system; superheated steam in the super-heater enters an ultra-disc dryer, and the ultra-disc dryer is successively connected to a water storage tank and a pre-heating-evaporator superheater to form a water heat transfer circulation system; a wet sludge bin is connected to the ultra-disc dryer and an inlet of a dried sludge bin, and dried sludge is conveyed to the dried sludge bin for storage; and a cement production system is separately connected with a waste gas outlet of the ultra-disc dryer and an outlet of the dried sludge bin.

The mixed molten salt includes potassium nitrate, sodium nitrate and graphite. The mixed molten salt composed of potassium nitrate and sodium nitrate is used as a heat transfer medium and a heat storage material, and graphite is added to improve the thermal conductivity of the mixed molten salt and reduce the melting point of the molten salt, so that the melting point thereof is about 100° C.

The solar concentrator is a parabolic trough type solar concentrator, which converts solar radiation energy into thermal energy. The parabolic trough surface of the solar concentrator can be adjusted according to the change of the daily illumination angle and intensity by selecting an optimal sunlight irradiation angle. The solar concentrator can be placed on the roof of a factory building to save space while ensuring no obstruction of other obstacles. The solar concentrator can convert low-density solar energy into high-density energy, and convert solar energy into thermal energy by the mixed molten salt, so that the temperature of the mixed molten salt reaches 400-500° C.

A molten salt pump is further disposed on a connection pipeline of the mixed molten salt heat transfer-heat storage circulation system. Further, the molten salt pump is disposed on a connection pipeline of the solar concentrator and the low-temperature molten salt storage tank. When sunlight is sufficient, a part of the generated high-temperature molten salt passes through the superheater and the preheating-evaporator to be subjected to heat exchange with water in a counter-current manner to generate the superheated steam, and another part of the generated high-temperature molten salt passes through the high-temperature molten salt storage tank so that the heat-absorbed high-temperature molten salt is stored. When sunlight is insufficient, the high-temperature molten salt stored in the high-temperature molten salt storage tank successively flows into three heat exchangers under the action of the molten salt pump to supplement heat.

An electric cabinet and a molten salt heater are further disposed in the mixed molten salt heat transfer-heat storage circulation system. The mixed molten salt is heated by the electric cabinet and the molten salt heater. The mixed molten salt is used for heat transfer and heat storage to solve the problem that solar energy can only be generated at specific time. A bypass electric heating system is disposed to improve the system stability, so that valley electricity can be used for supplementing heat at night or at other specific time. The system is coupled with a cement production system. Waste gas is introduced into the cement production system for waste burning. Dried sludge is mixed with other solid waste to enter the cement production system to prepare the sulphoaluminate cement. The stability of a solar sludge drying system is improved by disposing the molten salt storage tank and the standby electric heating system.

A circulating water pump is further disposed in the water heat transfer circulation system. Further, the circulating water pump is disposed on a connection pipeline of the water storage tank and the preheating-evaporator. Or a warning water level automatic water supplement device is disposed in the water storage tank.

Screw conveying equipment is disposed on a connection pipeline of the wet sludge bin and the ultra-disc dryer. Or, a condenser is disposed on a connection pipeline of the cement production system and the waste gas outlet of the ultra-disc dryer.

In one or more embodiments of the present invention, a method for preparing sulphoaluminate cement from solar energy stored heat dried sludge, based on the system for preparing sulphoaluminate cement from solar energy stored heat dried sludge, comprising:

heating a mixed molten salt by the solar concentrator, a part of the heated high-temperature mixed molten salt flowing to the high-temperature molten salt storage tank for storage, and the other part of the heated high-temperature mixed molten salt flowing to the superheater and the preheating-evaporator for heat exchange; making the mixed molten salt after heat exchange flow to the low-temperature molten salt storage tank, and re-flow into the solar concentrator under the action of the molten salt pump;

making superheated steam formed after performing heat exchange in the superheater enter the ultra-disc dryer to be subjected to heat exchange with wet sludge, the superheated steam condensing in the heat exchange process and entering the water storage tank, and water in the water storage tank re-entering the preheating-evaporator and the superheater for circulation under the action of the circulating water pump; conveying dried sludge to the dried sludge bin for storage, and the dried sludge entering the cement production system for preparing the sulphoaluminate cement after being mixed with solid waste, and making waste gas formed in the sludge drying process enter a decomposing furnace of the cement production system for incineration.

The heated high-temperature mixed molten salt stores heat of solar energy, and the temperature reaches 400-500° C. due to the low melting point and high heat transfer coefficient of the mixed molten salt. However, the mixed molten salt after heat exchange transfers heat to water in the evaporator to form superheated steam. The temperature of the mixed molten salt is reduced to 100-200° C. The temperature of the superheated steam is 180-250° C.

In order to improve the solid content of the sludge, the wet sludge is flocculated and compressed sludge. Further, the flocculation is performed with iron salt and mechanical compression is performed.

The sludge after flocculation and mechanical compression enters the ultra-disc dryer to exchange heat with the superheated steam generated by the superheater to achieve further drying treatment. The water content of the dried sludge can be adjusted according to different requirements, and can be reduced to 5% or less to the minimum. The superheated steam and the sludge exchange heat indirectly in the ultra-disc dryer without direct contact. Water after heat exchange can be recycled. After condensation, waste gas generated after drying can be introduced into a decomposing furnace for incineration, and the waste gas can be treated and used by a waste gas treatment system of a cement production line.

The dried sludge can be used for preparing the sulphoaluminate cement with solid waste such as desulphurized gypsum, aluminium ash, calcium carbide slag and waste incineration fly ash. In order to make full use of the dried sludge, it is very important to control the proportion during mixing. Therefore, the dry specific gravity of the dried sludge to the solid waste during mixing is 5-30: 15-40.

The solid waste is one or a combination of more of waste incineration fly ash, desulphurized gypsum, aluminium ash or calcium carbide slag. Further, the dry specific gravity of the dried sludge to the waste incineration fly ash the desulfurized gypsum, the aluminum ash or the calcium carbide slag is 13-24:5-30:18-35:17-27:12-20. At this ratio, it is advantageous to improve the utilization rate.

When the sun illumination intensity is low, the mixed molten salt is heated by using the valley electricity at night through the electric cabinet and the molten salt heater, by this time, valves at both ends of the solar concentrator are in a closed state, and the molten salt heater replaces the solar concentrator to supplement stored heat of the high-temperature molten salt. In this process, various situations are dealt with in an emergency way to enable the system to operate safely and stably, which solves the problem that solar energy is generated at specific time.

In one or more embodiments of the present invention, application of the system for preparing sulphoaluminate cement from solar energy stored heat dried sludge and/or the method for preparing sulphoaluminate cement from solar energy stored heat dried sludge in sewage treatment is provided.

The present invention is further described in detail below with reference to specific embodiments. It should be pointed out that the specific embodiments are intended to explain rather than limit the present invention.

Embodiment 1

A system for preparing sulphoaluminate cement from solar energy stored heat dried sludge is specifically as follows. A solar concentrator 1 is successively connected to a high-temperature molten salt storage tank 4, a superheater 6, a preheating-evaporator 7, a low-temperature molten salt storage tank 9 and a molten salt pump 5 to form mixed molten salt heat transfer-heat storage circulation. At the same time, in order to improve the stability of a solar sludge drying system, an electric cabinet 3 and a molten salt heater 2 are disposed. When the sunlight intensity is low, molten salt is heated by the electric cabinet 3 and the molten salt heater 2, so as to replace the solar concentrator to supplement the stored heat of high-temperature molten salt. Superheated steam formed in the superheater 6 enters an ultra-disc dryer 9. The ultra-disc dryer 9 is successively connected to a water storage tank 10, a circulating water pump 11, the preheating-evaporator 7 and the superheater 6 to form a water heat transfer circulation system. A wet sludge bin 12 is connected to screw conveying equipment 13 for conveying wet sludge from the wet sludge bin 12. The wet sludge bin 12 is connected to the ultra-disc dryer 9 and an inlet of a dried sludge bin 14. Dried sludge is conveyed to the dried sludge bin for storage. A condenser 15 is disposed on a waste gas outlet pipeline of the ultra-disc dryer and is connected to a cement production system 16. At the same time, an outlet of the dried sludge bin 14 is also connected to the cement production system 16. Waste gas in the ultra-disc dryer 9 is treated by the cement production system 16. The dried sludge is mixed with solid waste to prepare the sulphoaluminate cement in the cement production system 16.

Embodiment 2

Based on the system in Example 1, a specific method for performing sludge treatment and preparing sulphoaluminate cement was as follows.

Solar radiation energy was converted into thermal energy by a solar concentrator 1 to heat mixed molten salt. The temperature reached 400-500° C. The high-temperature mixed molten salt flowed to a high-temperature molten salt storage tank 4 via a valve under the action of a molten salt pump 5. A part of the high-temperature mixed molten salt was stored in the tank. The other part of the high-temperature mixed molten salt flowed to a superheater 6, a preheating-evaporator 7. In the superheater and the preheating-evaporator, water exchanged heat with the high-temperature mixed molten salt. Liquid water was changed into superheated steam, and the temperature was 180° C. or above. After the heat exchange of the high-temperature molten salt, the temperature was reduced to 150° C. The high-temperature molten salt flowed to a low-temperature molten salt storage tank 8 under the action of the molten salt pump 5. The high-temperature molten salt re-flowed into the solar concentrator 1 via a valve under the action of the pump, so as to complete mixed molten salt heat transfer-heat storage circulation.

Superheated steam formed in the superheater 6 entered an ultra-disc dryer 9 to be subjected to heat exchange with flocculated and compressed sludge. The superheated steam condensed into liquid water in the heat exchange process, entering a water storage tank 10 under the action of a circulating water pump 11. A warning water level automatic water supplement device was disposed in the water storage tank 10. When the water level was less than ½, water was automatically supplemented. The water re-entered the pre-heating-evaporator 7 and the super heater 6 also under the action of the circulating water pump 11 to complete water heat transfer circulation.

The sludge after being flocculated and mechanically compressed was conveyed to a wet sludge bin 12. The sludge entered the ultra-disc dryer 9 via screw conveying equipment 13 to be heated by the superheated steam. Water of the sludge evaporated. The residence time of the sludge in the ultra-disc dryer could be adjusted according to actual requirements. The water content of the sludge could be further adjusted. Generally, the water content of the sludge at the outlet of the ultra-disc dryer 9 was set to be 30%. The dried sludge was conveyed to a dried sludge bin 14 for storage.

In the drying process of the sludge in the ultra-disc dryer 9, after condensing generated waste gas via a condenser 15, the waste gas entered a decomposing furnace of a cement production system 16 for incineration treatment, and then entered a waste gas treatment system of a cement production line together with waste gas generated in the cement clinker firing process.

The dried sludge and the pretreated waste incineration fly ash, desulfurized gypsum, aluminum ash and calcium carbide slag were calculated during mixing according to a dry weight ratio: 21.15:6.02:30.78:26.2:15.85, and they entered the cement production system 16 for firing of sulphoaluminate cement clinker. The three rate values of the clinker which was fired were: P=2.04; C=0.945; and N=3.55. Components of various solid waste after pretreatment are shown in Table 1:

TABLE 1

| Components of various solid waste after pretreatment (unit: %) | | | | | | |
|---|---|---|---|---|---|---|
| Component | CaO | SiO$_2$ | Al$_2$O$_3$ | Fe$_2$O$_3$ | SO$_3$ | Loss |
| Solar energy stored heat dried sludge | 10.62 | 10.30 | 8.50 | 48.81 | 2.77 | 38.23 |
| Waste incineration fly ash after pretreatment | 34.53 | 28.45 | 11.24 | 8.05 | 6.80 | 13.00 |
| Desulfurized gypsum | 49.44 | 3.61 | 1.73 | 0.84 | 40.62 | 25.61 |
| Aluminum ash | 2.21 | 2.26 | 85.46 | 0.85 | 0.54 | 16.94 |
| Calcium carbide slag | 94.02 | 3.20 | 1.32 | 0.40 | 0.72 | 16.94 |

In addition, when the sun illumination intensity is very low in winter or in adverse weather such as continuous rainfall, the molten salt is heated by using the valley electricity at night through the electric cabinet 3 and the molten salt heater 2. By this time, valves at both ends of the solar concentrator 1 are in a closed state, and the molten salt heater 2 replaces the solar concentrator 1 to supplement stored heat of the high-temperature molten salt.

The foregoing descriptions are merely preferred embodiments of the present invention, but are not intended to limit the present invention. Although the present invention has been described in detail with reference to the foregoing embodiments, for a person of ordinary skill in the art, modifications can be made to the technical solutions described in the foregoing embodiments, or equivalent replacements can be made to some technical features in the technical solutions. Any modification, equivalent replacement, or improvement made within the spirit and principle of the present invention shall fall within the protection scope of the present invention.

What is claimed is:

1. A system for preparing sulphoaluminate cement from solar energy stored heat dried sludge, wherein a solar concentrator is successively connected to a high-temperature molten salt storage tank, a superheater, a preheating-evaporator and a low-temperature molten salt storage tank to form a mixed molten salt heat transfer-heat storage circulation system; superheated steam in the superheater enters an ultra-disc dryer, and the ultra-disc dryer is successively connected to a water storage tank and a preheating-evaporator superheater to form a water heat transfer circulation system; a wet sludge bin is connected to the ultra-disc dryer and an inlet of a dried sludge bin, and dried sludge is conveyed to the dried sludge bin for storage; and a cement production system is separately connected with a waste gas outlet of the ultra-disc dryer and an outlet of the dried sludge bin.

2. The system for preparing sulphoaluminate cement from solar energy stored heat dried sludge according to claim 1, wherein the solar concentrator is a parabolic trough type solar concentrator; or, a molten salt pump is further disposed on a connection pipeline of the mixed molten salt heat transfer-heat storage circulation system; and further, the molten salt pump is disposed on a connection pipeline of the solar concentrator and the low-temperature molten salt storage tank.

3. The system for preparing sulphoaluminate cement from solar energy stored heat dried sludge according to claim 1, wherein an electric cabinet and a molten salt heater are further disposed in the mixed molten salt heat transfer-heat storage circulation system, a mixed molten salt is heated through the electric cabinet and the molten salt heater; or, the mixed molten salt comprises potassium nitrate, sodium nitrate and graphite.

4. The system for preparing sulphoaluminate cement from solar energy stored heat dried sludge according to claim 1, wherein a circulating water pump is further disposed in the water heat transfer circulation system; further, the circulating water pump is disposed on a connection pipeline of the water storage tank and the preheating-evaporator; or a warning water level automatic water supplement device is disposed in the water storage tank.

5. The system for preparing sulphoaluminate cement from solar energy stored heat dried sludge according to claim 1, wherein screw conveying equipment is disposed on a connection pipeline of the wet sludge bin and the ultra-disc dryer; or, a condenser is disposed on a connection pipeline of the cement production system and a waste gas outlet of the ultra-disc dryer.

6. A method for preparing sulphoaluminate cement from solar energy stored heat dried sludge, based on the system for preparing sulphoaluminate cement from solar energy stored heat dried sludge according to claim 1, comprising:

heating a mixed molten salt by the solar concentrator, a part of the heated high-temperature mixed molten salt flowing to the high-temperature molten salt storage tank for storage, and the other part of the heated high-temperature mixed molten salt flowing to the superheater and the preheating-evaporator for heat exchange; making the mixed molten salt after heat exchange flow to the low-temperature molten salt storage tank, and re-flow into the solar concentrator under the action of the molten salt pump;

making superheated steam formed after performing heat exchange in the superheater enter the ultra-disc dryer to be subjected to heat exchange with wet sludge, the superheated steam condensing in the heat exchange process and entering the water storage tank, and water in the water storage tank re-entering the preheating-evaporator and the superheater for circulation under the action of the circulating water pump; conveying dried sludge to the dried sludge bin for storage, and the dried sludge entering the cement production system for preparing the sulphoaluminate cement after being mixed with solid waste; and making waste gas formed in the sludge drying process enter a decomposing furnace of the cement production system for incineration.

7. The method for preparing sulphoaluminate cement from solar energy stored heat dried sludge according to claim 6, wherein a temperature of the heated high-temperature mixed molten salt is 400-500° C.; or, a temperature of the mixed molten salt after heat exchange is 100-200° C.; or, a temperature of the superheated steam is 180-250° C.

8. The method for preparing sulphoaluminate cement from solar energy stored heat dried sludge according to claim 6, wherein the wet sludge is flocculated and compressed sludge; further, the flocculation is performed with iron salt and mechanical compression is performed; or, a dry specific gravity of dried sludge to solid waste during mixing is 5-30:15-40; further, the solid waste is one or a combination of more of waste incineration fly ash, desulphurized gypsum, aluminium ash or calcium carbide slag; yet further, a dry specific gravity of the dried sludge to the waste incineration fly ash, the desulfurized gypsum, the aluminum ash or the calcium carbide slag is 13-24:5-30:18-35:17-27:12-20.

9. The method for preparing sulphoaluminate cement from solar energy stored heat dried sludge according to claim 6, wherein when the sun illumination intensity is low, the mixed molten salt is heated by using the valley electricity at night through the electric cabinet and the molten salt heater, by this time, valves at both ends of the solar concentrator are in a closed state, and the molten salt heater replaces the solar concentrator to supplement stored heat of the high-temperature molten salt.

10. An application of the system for preparing sulphoaluminate cement from solar energy stored heat dried sludge according to claim 1 and/or the method for preparing sulphoaluminate cement from solar energy stored heat dried sludge based on the system for preparing sulphoaluminate cement from solar energy stored heat dried sludge according to claim 1, comprising:

heating the mixed molten salt by the solar concentrator, the part of the heated high-temperature mixed molten salt flowing to the high-temperature molten salt storage tank for storage, and the other part of the heated high-temperature mixed molten salt flowing to the superheater and the preheating-evaporator for heat exchange; making the mixed molten salt after heat exchange flow to the low-temperature molten salt storage tank, and re-flow into the solar concentrator under the action of the molten salt pump;

making superheated steam formed after performing heat exchange in the superheater enter the ultra-disc dryer to be subjected to heat exchange with wet sludge, the superheated steam condensing in the heat exchange process and entering the water storage tank, and water in the water storage tank re-entering the preheating-evaporator and the superheater for circulation under the action of the circulating water pump; conveying dried sludge to the dried sludge bin for storage, and the dried sludge entering the cement production system for preparing the sulphoaluminate cement after being mixed with solid waste; and making waste gas formed in the sludge drying process enter the decomposing furnace of the cement production system for incineration.

* * * * *